United States Patent
Selvaggi et al.

(10) Patent No.: US 7,743,376 B2
(45) Date of Patent: Jun. 22, 2010

(54) METHOD AND APPARATUS FOR MANAGING TASKS IN A MULTIPROCESSOR SYSTEM

(75) Inventors: Richard J. Selvaggi, Doylestown, PA (US); Larry A. Pearlstein, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 1562 days.

(21) Appl. No.: 10/939,804

(22) Filed: Sep. 13, 2004

(65) Prior Publication Data

US 2006/0059484 A1 Mar. 16, 2006

(51) Int. Cl.
*G06F 9/46* (2006.01)
*G06F 15/76* (2006.01)

(52) U.S. Cl. .................... 718/100; 718/102; 712/34

(58) Field of Classification Search ............... 718/100, 718/101, 102, 104; 711/164, 168; 712/34
See application file for complete search history.

(56) References Cited

U.S. PATENT DOCUMENTS

| | | | |
|---|---|---|---|
| 4,101,960 A * | 7/1978 | Stokes et al. ................ 712/22 |
| 4,123,795 A * | 10/1978 | Dean et al. .................. 718/103 |
| 4,339,819 A * | 7/1982 | Jacobson ..................... 714/734 |
| 4,694,426 A * | 9/1987 | Mason ......................... 365/78 |
| 4,965,750 A * | 10/1990 | Matsuo et al. ............... 345/531 |
| 5,134,561 A * | 7/1992 | Liptay ......................... 711/164 |
| 5,577,250 A * | 11/1996 | Anderson et al. ........... 718/100 |
| 5,598,514 A * | 1/1997 | Purcell et al. ............... 345/418 |
| 5,617,570 A * | 4/1997 | Russell et al. ............... 719/312 |
| 5,767,907 A * | 6/1998 | Pearlstein ................ 375/240.25 |
| 5,940,089 A * | 8/1999 | Dilliplane et al. .......... 345/553 |
| 5,969,768 A * | 10/1999 | Boyce et al. ................ 348/565 |
| 6,078,742 A * | 6/2000 | Chow .......................... 703/25 |
| 6,141,456 A * | 10/2000 | Pearlstein et al. ........... 382/250 |
| 6,370,596 B1 * | 4/2002 | Dakhil ......................... 710/15 |
| 6,549,951 B1 * | 4/2003 | Hui et al. ..................... 709/250 |
| 6,631,484 B1 * | 10/2003 | Born ............................. 710/305 |
| 6,782,445 B1 * | 8/2004 | Olgiati et al. ................ 711/100 |
| 6,898,700 B2 * | 5/2005 | Alexander et al. ........... 712/244 |
| 6,959,372 B1 * | 10/2005 | Hobson et al. ............... 711/168 |

(Continued)

FOREIGN PATENT DOCUMENTS

EP 992916 A1 * 4/2000

(Continued)

OTHER PUBLICATIONS

Analog Devices Inc., ADSP-TS201 TigerSHARC Processor Programming Reference, Revision 0.1, Jun. 2003, USA.

*Primary Examiner*—Meng-Ai An
*Assistant Examiner*—Caroline Arcos
(74) *Attorney, Agent, or Firm*—McAndrews, Held & Malloy, Ltd.

(57) ABSTRACT

In a multiprocessor system, a task control processor may be placed in the path connecting each execution processor to a system bus. Such task control processors may detect the completion of a first task on an associated execution processor and, responsively, generate commands to lead to the initiation of a second task on the same, or another, execution processor. Such task completion detection and task initiation by the task control processors removes, from a central processor or the execution processors, the burden of performing such tasks, thereby improving the efficiency of the entire system.

18 Claims, 8 Drawing Sheets

U.S. PATENT DOCUMENTS

| | | | |
|---|---|---|---|
| 2001/0032305 A1* | 10/2001 | Barry | 712/34 |
| 2001/0052065 A1* | 12/2001 | Alexander, III et al. | 712/228 |
| 2002/0083357 A1* | 6/2002 | McGowan et al. | 713/323 |
| 2003/0037089 A1* | 2/2003 | Cota-Robles et al. | 709/1 |
| 2004/0088519 A1* | 5/2004 | Karim | 712/1 |
| 2004/0236743 A1* | 11/2004 | Blaicher et al. | 707/7 |
| 2005/0160200 A1* | 7/2005 | Saito | 710/22 |
| 2005/0237326 A1* | 10/2005 | Kuhne | 345/506 |

FOREIGN PATENT DOCUMENTS

| | | | |
|---|---|---|---|
| WO | WO 8803682 A1 * | 5/1988 | |

* cited by examiner

METHOD AND APPARATUS FOR MANAGING TASKS IN A MULTIPROCESSOR SYSTEM

FIELD OF THE INVENTION

The present invention relates to multiprocessor systems and, more particularly, to managing tasks in a multiprocessor system.

BACKGROUND

Multiprocessor systems are typically used in applications wherein several execution processors, each having a dedicated function, can relieve a central processor of processing load. In addition, parallel processing by such execution processors may allow for reduced overall processing time.

The various execution processors execute a series of tasks. A task is a series of defined steps to be executed by a processor, typically executed as the result of a series of processor executable instructions stored within processor readable memory. Typically, the series of instructions that define the task are stored in processor readable memory associated with the given execution processor. As well, a task typically has a defined beginning and end. A series of tasks, in turn, may be used to execute a program.

Many execution processors initiate performance of a particular task in response to sensing that an associated register of another execution processor has been modified. A given task may be arranged to act on data that is in a memory shared by multiple execution processors or to act on data in registers that are local to the execution processor executing the given task.

Tasks running on a multiprocessor system, which may have many tasks running concurrently on many execution processors, typically have both data and control dependencies among each other.

Data dependency between two tasks requires access to data being processed by a first task for processing by a second task. As such, tasks must be managed so that the second task does not attempt to access the data until the processing by the first task is complete.

Control dependency between two tasks requires access to a system component, that is receiving instructions according to processing by a first task running at a first execution processor, by a second execution processor according to processing by a second task. In such a case, the tasks must be managed so that the second task does not attempt to generate instructions for the system component until the processing by the first task is complete.

In known multiprocessor systems, fixed, hardware flow-control may be arranged among execution processors to manage data and task dependencies. The tasks to be run at each of the execution processors must be known ahead of time, along with the data and control dependencies of the known tasks. The execution processors are prearranged to indicate the completion of a given task to other execution processors for which such an indication is useful in determining timing of the initiation of tasks at the other execution processors. This solution is not flexible or programmable.

In other multiprocessor systems, a central processor initiates tasks at execution processors and periodically polls the execution processors to determine the tasks running at the execution processors. The central processor may wait until a result of polling a first execution processor is an indication that a first task has completed before instructing a second execution processor to initiate a second task, where the second task has data or control dependencies on the first task. In order that the second task may be initiated without undue delay after the completion of the first task, the central processor must poll the execution processors frequently. Although this solution may be considered flexible and/or programmable, it requires valuable central processor cycles resulting from the central processor's frequent interaction with the execution processors of the multiprocessor system.

In yet other multiprocessor systems, the central processor responds to interrupts generated by the execution processors at the completion of tasks. Thus excessive central processor cycles are eliminated. Central processor interrupts initiated by the execution processors indicate task completion. The central processor may then use this information, along with information about data and control dependencies between tasks to initiate dependent tasks. However, typical central processor response time to interrupts may impair multiprocessor system performance: the central processor may not be able to keep up with tasks that need to communicate with each other on a frequent basis.

Clearly, then, there is a need for a new solution for managing tasks in a multiprocessor system, where the new solution allows for flexible control of the initiation of the execution of tasks at the execution processors.

SUMMARY

In a multiprocessor system including multiple execution processors, programmable task control processors are provided between the execution processors and a communications medium by which the execution processors normally receive task initiation instructions. The task control processors control delivery of the task initiation instructions and, thereby, control the initiation of the execution of tasks at the execution processors. A group of these programmable task control processors may be connected together in a network, so that the network can be programmed to implement any given predetermined flow-of-tasks among execution processors in the multiprocessor system.

In accordance with an aspect of the present invention there is provided a multiprocessor system. The multiprocessor system includes a plurality of execution processors, each of the execution processors for executing tasks, a plurality of task control processors and a central processor in communication with the task control processors for providing execution control instructions to the task control processors. Each task control processor of the plurality of task control processors is in communication with at least one of the plurality of execution processors for controlling initiation of execution of one of the tasks on at least one of the plurality of execution processors. Additionally, each task control processor includes memory for storing execution control instructions and task initiation instructions, the execution control instructions to be executed by each task control processor to control delivery of the task initiation instructions to at least one of the plurality of execution processors.

In accordance with another aspect of the present invention there is provided, at a first task control processor, a method of managing tasks in a multiprocessor system. The method includes receiving execution control instructions and receiving a task initiation instruction. The method also includes, according to the execution control instructions, transmitting the task initiation instruction to an associated execution processor to initiate execution of a first task, detecting completion of the first task on the associated execution processor and, responsive to the detecting the completion, controlling delivery of a state register manipulation command to a second task control processor.

In accordance with a further aspect of the present invention there is provided, a method of managing tasks in a multiprocessor system. The method includes receiving execution control instructions, receiving a task initiation instruction and receiving a state register manipulation command, the state register manipulation command setting a state of a state register. The method also includes, according to the execution control instructions, determining the state of the state register and, responsive to the determining the state of the state register, controlling delivery of the task initiation instruction to an associated execution processor to initiate execution of a task.

In accordance with a still further aspect of the present invention there is provided a task control processor in communication with an execution processor. The task control processor includes a memory for storing execution control instructions and task initiation instructions and a task control processor core for receiving the execution control instructions and the task initiation instructions from the memory and executing the execution control instructions to control delivery of the task initiation instructions to the execution processor.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
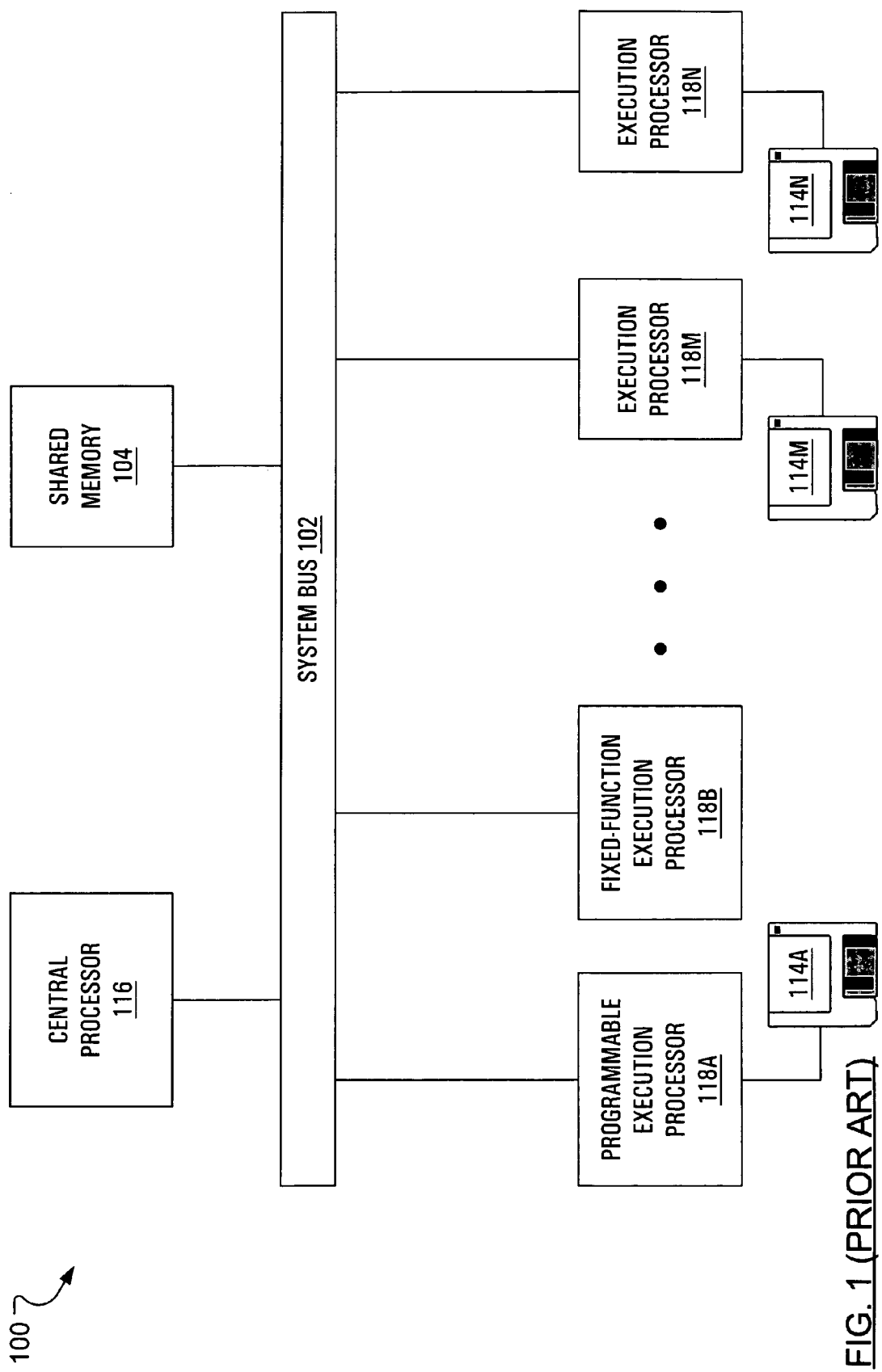
FIG. 1 illustrates a prior art multiprocessor system.

FIG. 1 is a block diagram illustrating a known multiprocessor system 100. Multiprocessor system 100 has a set of N execution processors (N being an unspecified number) including a first execution processor 118A, a second execution processor 118B, . . . (individually or collectively 118) connected to a system bus 102. While the first execution processor 118A may be considered exemplary of a programmable execution processor (e.g., a Digital Signal Processor or a Reduced Instruction Set Computer), the second execution processor 118B may be considered exemplary of a fixed-function execution processor (e.g., a motion estimation unit, a discrete-cosine transform unit, a direct memory access unit, etc). The programmable ones of the execution processors 118 are in communication with computer readable memory 114A, 114M, . . . (individually or collectively 114) storing program instructions defining tasks to be executed by the programmable ones of the execution processors 118. Also connected to the system bus 102, for communication with the execution processors 118, are a central processor 116 and a shared memory 104.

Tasks defined by instructions stored within memory 114 are initiated at an execution processor 118 by changing registers at the execution processor 118. Similarly, task completion may be determined by polling registers at that processor. Execution of sequential tasks at execution processors 118 may be controlled by central processor 116, which initiates tasks and polls their completion using these registers, as detailed above.

System bus 102 is illustrated abstractly and may be understood to include many active elements, such as a centralized router (not shown), to route command units between central processor 116 and execution processors 118 and between execution processors 118. In an exemplary implementation, the system bus 102 has an eight kilobyte address space, of which one kilobyte portions are dedicated to each of the execution processors 118.

Figure 2:
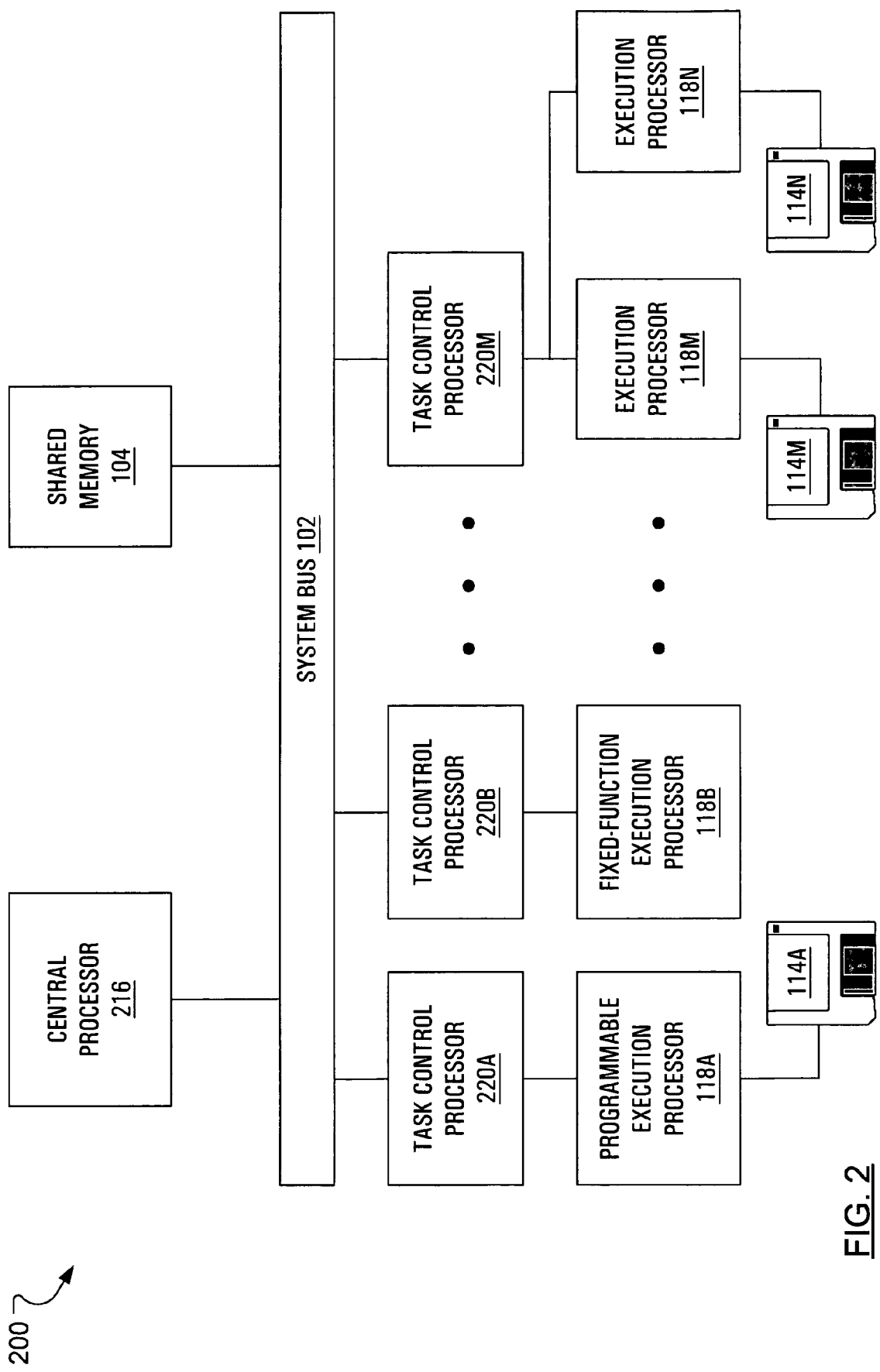
FIG. 2 illustrates a multiprocessor system including task control processors according to an embodiment of the present invention.

FIG. 2 is a block diagram illustrating a multiprocessor system 200 exemplary of embodiments of the present invention, wherein like parts to the typical multiprocessor system 100 of FIG. 1 have been given like reference numerals. The multiprocessor system 200 includes execution processors 118 and shared memory 104, familiar from the typical multiprocessor system 100 of FIG. 1. The multiprocessor system 200 also includes a central processor 216 adapted to incorporate aspects of the present invention.

Unlike the typical multiprocessor system 100 of FIG. 1, execution processors 118 of the multiprocessor system 200 of FIG. 2 connect to the system bus 102 through task control processors (TCPs) 220A, 220B . . . (individually or collectively 220). Specifically, a first TCP 220A is associated with the first execution processor 118A, a second TCP 220B associated with the second execution processor 118B, etc. Notably, there need not be a one-to-one mapping between task control processors 220 and execution processors 118. As illustrated, both an mth execution processor 118M and an nth execution processor 118N connect to the system bus 102 through an mth TCP 220M.

Now, central processor 216 generates commands to be interpreted by TCPs 220 or execution processors 118. Execution processor commands generated by central processor 216 of the multiprocessor system 200 of FIG. 2 include the known task-related commands (for initiating and monitoring tasks) that are also generated by the central processor 116 in the typical multiprocessor system 100 of FIG. 1. The type of commands called task-related commands may, for instance, include read commands and write commands directed to the registers of the execution processors 118. Read commands directed to the registers of the execution processors 118 may primarily be used for monitoring the state of a task run on a given execution processor 118. Write commands directed to the registers of the execution processors 118 may initiate task execution and, as a result, be called task initiation instructions. Write commands directed to the registers of the execution processors 118 may also assist in configuring a task on a given execution processor 118 by, for example, passing parameters to the given execution processor 118. Write commands of this type may be called task configuration instructions.

Commands generated by central processor 216 to be interpreted by TCPs 220 are referred to as execution control or flow-control commands.

Figure 3:
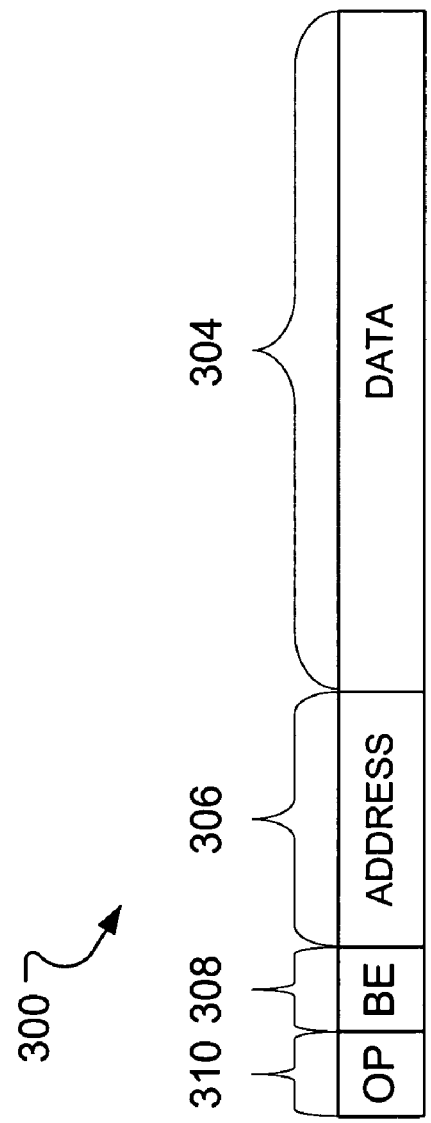
FIG. 3 illustrates a structure for an exemplary command unit.

A structure 300 of an exemplary command unit is illustrated in FIG. 3. The structure 300 includes a data field 304, an address field 306, a byte enable field 308 and an opcode field 310. An exemplary command unit having this structure 300 is 50 bits long, with the data field 304 being 32 bits long, the address field 306 being 13 bits long, the byte enable field 308 being 4 bits long and the opcode field 310 being 1 bit long. Bits in address field 306 are used to uniquely identify one of the plurality of TCPs 220 or execution processors 118. More precisely, the address in address field 306 may be used by the TCP 220 to distinguish between a command unit carrying a flow-control command, to be executed internally, and a command unit carrying a task-related command, to be passed on to an associated execution processor 118.

Alternatively or additionally, it should be apparent that the TCPs 220 may be preloaded with instructions that specify a manner in which to control delivery of task initiation instructions to an associated execution processor 118. Essentially, the TCP 220 itself can execute a sequence of commands (both flow-control commands and task-related commands). These commands may be stored in a memory of the TCP 220 such that the central processor 216 may trigger the TCP 220 to execute the sequence of commands; with the TCP 220 halting itself when encountering some sort of "halt" flow-control command. When the TCP 220 executes a halt flow-control command, the TCP 220 returns to a state of waiting for a command to arrive into the command FIFO 406. Such an arrangement may be considered useful where the central processor 216 is required to instruct the TCP 220 to execute the same commands over-and-over. This mechanism saves the central processor 216 from multiple writes of the same list of commands to the TCP command FIFO 406 and replaces these multiple writes with the single write to trigger the execution, at the TCP 220, of the sequence of commands.

Figure 4:
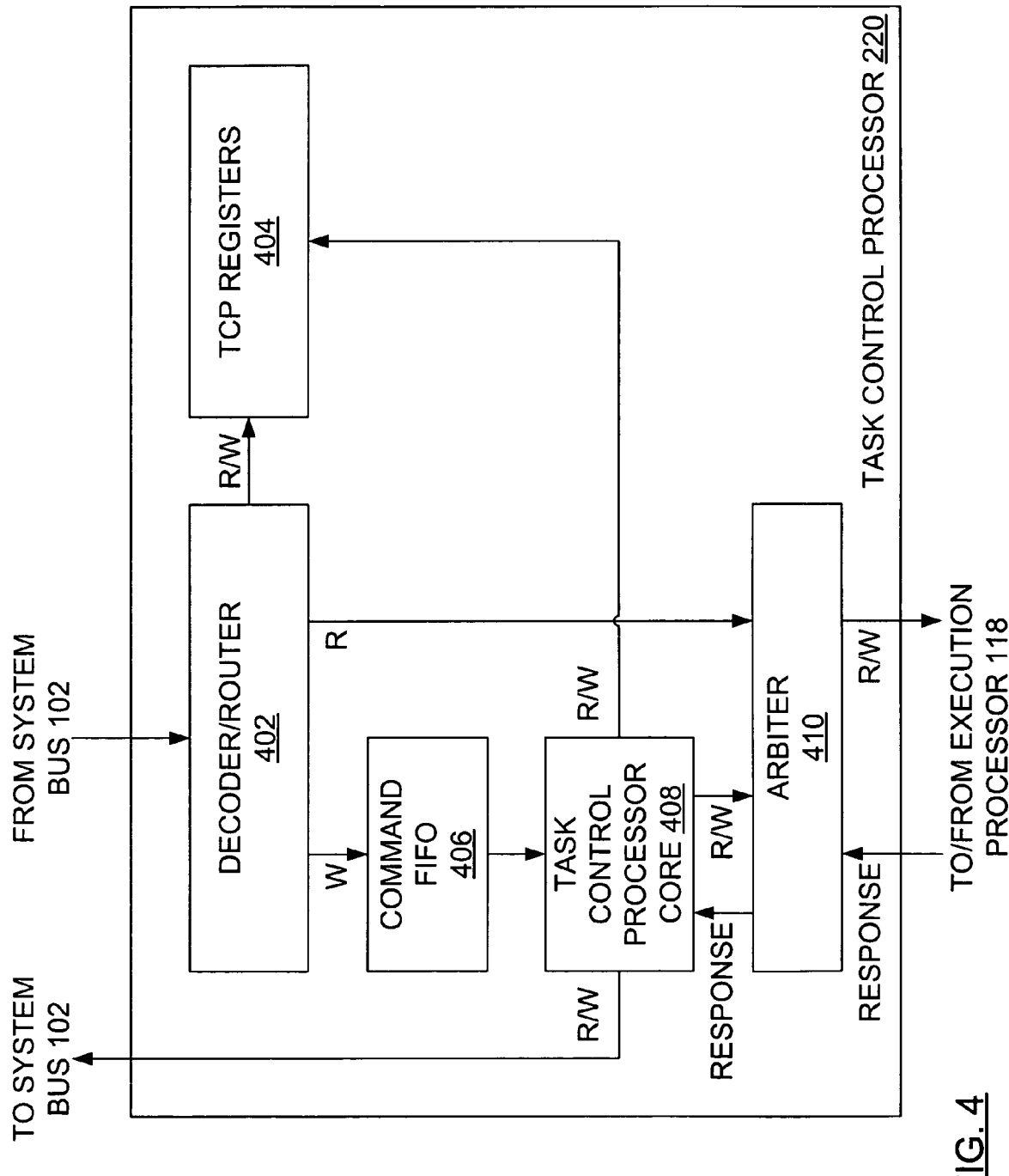
FIG. 4 illustrates an exemplary task control processor for the multiprocessor system of FIG. 2, according to an embodiment of the present invention.

An example task control processor 220 is illustrated in more detail in FIG. 4. Task control processor 220 receives command units carrying both flow-control commands and task-related commands from the system bus 102 at a decoder/router 402. Decoder/router 402 decodes commands carried by command units received from system bus 102. Such decoding may lead to queuing a received command unit whose address field 306 identifies TCP 220 or associated execution processor 118.

Command memory 406, implemented as a first-in-first-out (FIFO) queue connected to the decoder/router 402, stores the command units that have been accepted from the system bus 102 at the decoder/router 402 and routed thereto. Command FIFO 406 stores command units carrying commands of both types written by the decoder/router 402 for eventual reading by a task control processor core 408.

Also connected to the decoder/router 402 are a collection of TCP registers 404 including control registers, status registers and multiple semaphores. A semaphore is known to be a single bit state register that may be set or cleared to convey information between processes. Decoding by decoder/router 402 may also lead to, according to a received flow-control command, reading from or writing to TCP registers 404, where one of TCP registers 404 is identified in the address field 306 of the command unit.

Additionally, by decoding the contents of the opcode field 310 of the received command unit, decoder/router 402 may determine whether a task-related command (addressed to an associated execution processor 118) is to be queued in the command FIFO 406 (e.g., write commands) or sent directly to the associated execution processor 118 (e.g., read commands).

Command units written to the command FIFO 406 by the decoder/router 402 are read by a task control processor core 408. Task control processor core 408 assesses, based on the address in address field 306, whether a queued command unit in FIFO 406 carries a flow-control command or a task-related command. Additionally, task control processor core 408 executes those flow-control commands extracted from the data field 304 of a command unit read from the command FIFO 406. Such execution may result in a command unit being generated and directed to the TCP registers 404 or the system bus 102. Additionally, under control of flow-control commands, task control processor core 408 directs command units that include task-related commands to an associated execution processor 118 via an arbiter 410.

As discussed, one kilobyte of address space may be associated with each of the execution processors 118 for addressing command units from the central processor 216 (or other elements external to the execution processors 118). As is often the case, a portion, say, 256 bytes, of the one kilobyte associated with each execution processor 118 may be reserved. Aspects of the present invention may take advantage of the reserved portion. For instance, the first TCP 220A associated with the first execution processor 118A may accept all command units with an address in the one kilobyte of address space associated with the execution processor 118A. The decoder/router 402 may recognize that a command unit with an address in the reserved portion of the address space carries a flow-control command that is to be directed to the task control processor core 408 or the collection of TCP registers 404.

As illustrated in FIG. 4, arbiter 410 is in communication with the decoder/router 402, task control processor core 408 and an associated execution processor 118. Arbiter 410 receives command units carrying task-related commands from both the decoder/router 402 and the task control processor core 408 and transmits the task-related command units to the associated execution processor 118. Arbiter 410 alternately selects command units received from decoder/router 402 and task control processor core 408 for transmission to an associated execution processor 118.

A flow-control command, in the data field 304 of a command unit 300, for execution by the task control processor core 408 may have a predetermined structure that includes: a field for indicating the operation to be performed (read, read-until, write); a field for indicating the size of the data to be read, i.e., a byte, a half word (two bytes) or a word (four bytes); a field for indicating the "mode of the data", that is, whether the data is immediate or obtained from the data register; a field for indicating the "mode of the address", that is, whether the address is an immediate address, an address in the address register or additionally, if that address register should be incremented; a field for including a code that indicates a test condition for a read-until command, where test conditions may include: Equal (==); NotEqual (!=); LessThan (<); GreaterThan (>); MaskEqual; and MaskNotEqual, and the mask related conditions relate to applying a mask to the data gathered by the read before comparing the result to a reference value; a field for supplying an immediate address; a field for supplying immediate data; a field for supplying the least significant bits; and a field for indicating the width of the data value to be read and tested.

Figure 8:
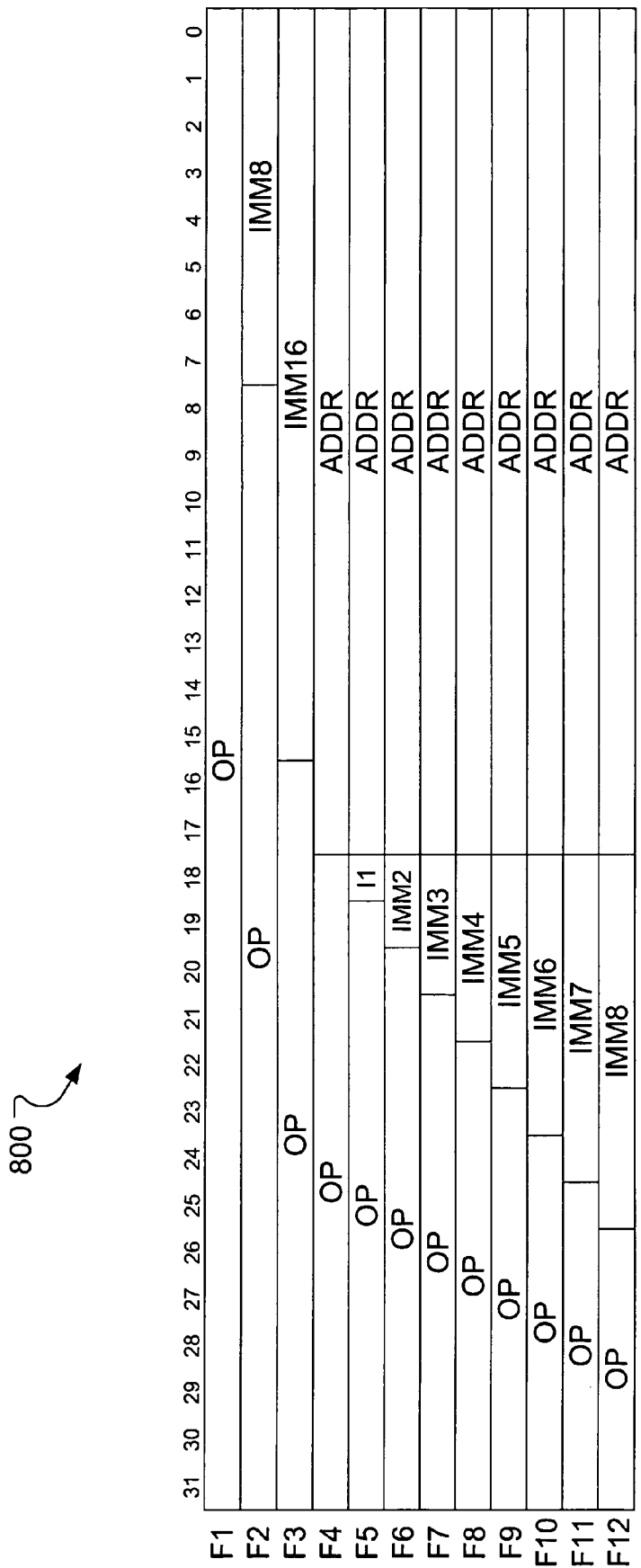
FIG. 8 illustrates a table of exemplary formats for commands that the task control processor core interprets.

Flow-control commands may have a format selected from formats presented in a table 800 of formats for flow-control commands illustrated in FIG. 8, wherein not all of the above-described fields are explicitly shown. For example, a flow-control command with a format referenced as "F8" has a 10-bit operational code (OP) referencing 4-bits of immediate data (IMM4) and an 18-bit address (ADDR).

Using an appropriate combination of the variables in the fields that have been outlined, flow-control commands, which are considered commands for the task control processor core 408, may be formed by a register decoder/router internal to task control processor core 408. Exemplary flow-control commands include:

Repeatedly Read 8-bit location ADDR, until field M:N becomes==IMMEDIATE
Repeatedly Read 8-bit location ADDR, until field M:N becomes!=IMMEDIATE
Repeatedly Read 8-bit location ADDR, until field M:N becomes<IMMEDIATE
Repeatedly Read 8-bit location ADDR, until field M:N becomes>IMMEDIATE
Repeatedly Read 8-bit location ADDR, until (data & IMM8) ==IMM8
Repeatedly Read 8-bit location ADDR, until (data & IMM8) !=IMM8
Repeatedly Read 8-bit location ADDR, until (data & IMM8) ==DR[7:0]
Repeatedly Read 8-bit location ADDR, until (data & IMM8) !=DR[7:0]
Read 1-byte from location ADDR, and put data into DR[7:0].
Read 2-bytes from location ADDR, and put data into DR[15:0].
Read 4-bytes from location ADDR, and put data into DR[31:0].
Read 1-byte from location pointed to by AR, and put data into DR[7:0].
Read 2-bytes from location pointed to by AR, and put data into DR [15:0].
Read 4-bytes from location pointed to by AR, and put data into DR[31:0]
Read 1-byte from location pointed to by AR, and put data into DR[7:0]. (with auto-increment by 1)
Read 2-bytes from location pointed to by AR, and put data into DR[15:0]. (with auto-increment by 2)
Read 4-bytes from location pointed to by AR, and put data into DR[31:0]. (with auto-increment by 4)
Write 1-byte Immediate to location ADDR.
Write 1-byte Immediate to location pointed to by AR.
Write 2-byte Immediate to location pointed to by AR.
Write 1-byte Immediate to location pointed to by AR. (with auto-increment by 1)
Write 2-byte Immediate to location pointed to by AR. (with auto-increment by 2)
Write 1-byte from DR[7:0] to location ADDR.
Write 2-bytes from DR[15:0] to location ADDR.
Write 4-bytes from DR[31:0] to location ADDR.
Write 1-byte from DR[7:0] to location pointed to by AR.
Write 2-bytes from DR[15:0] to location pointed to by AR.
Write 4-bytes from DR[31:0] to location pointed to by AR.
Write 1-byte from DR[7:0] to location pointed to by AR. (with auto-increment by 1)
Write 2-bytes from DR[15:0] to location pointed to by AR. (with auto-increment by 2)
Write 4-bytes from DR[31:0] to location pointed to by AR. (with auto-increment by 4)

The location ADDR, which is present in some flow-control commands, may be arranged to be large enough to address any device on the entire multiprocessor system bus 102. A register decoder/router (described below) in the task control processor core 408 may then be arranged to decode enough of the ADDR to determine whether the command unit is destined for: the TCP registers 404; the associated execution processor 118; or the system bus 102.

Notably, some of the read commands may be termed read-until commands because the read command is to be repeated until a condition is met.

Figure 5:
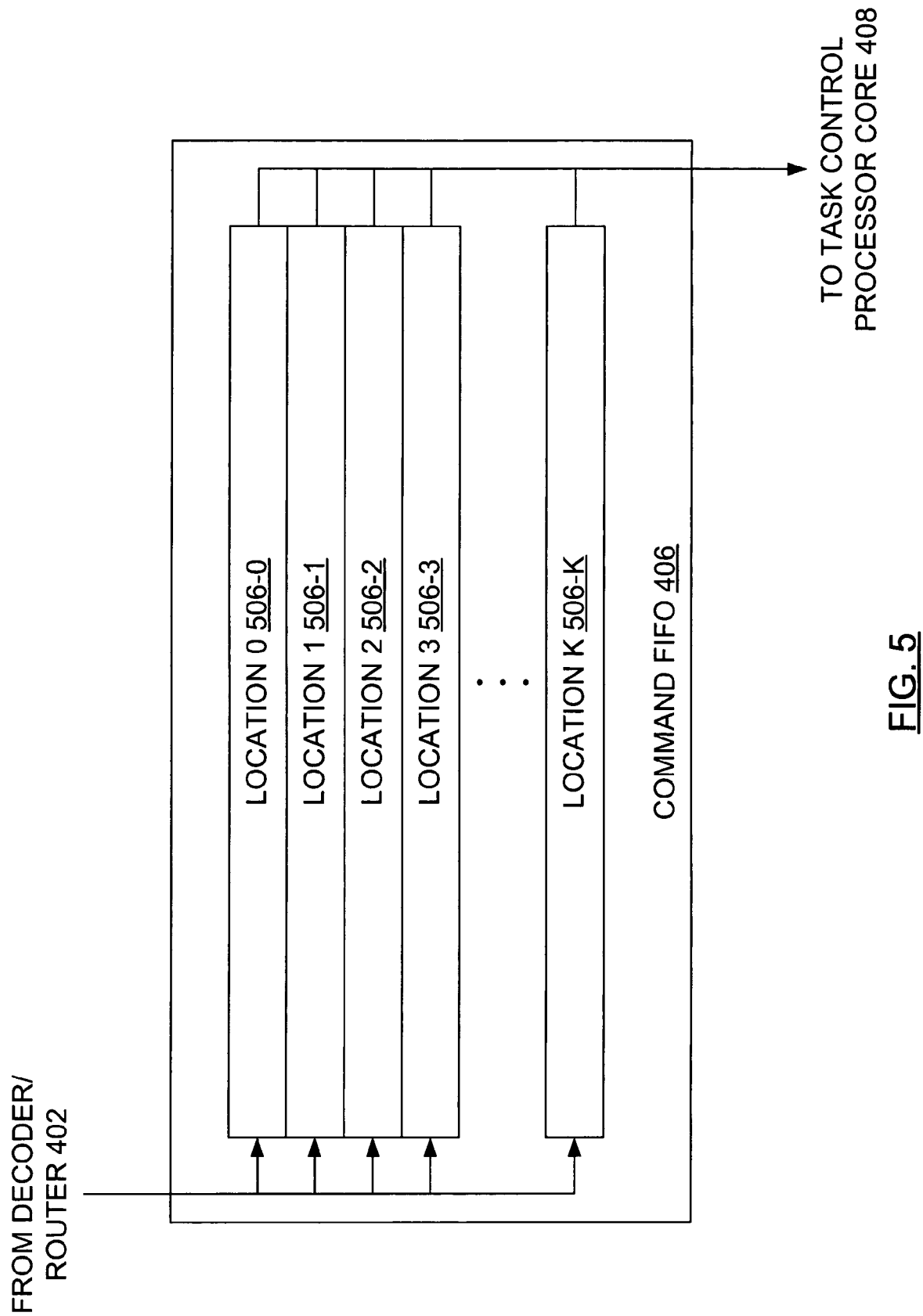
FIG. 5 illustrates an exemplary command FIFO for the exemplary task control processor of FIG. 4, according to an embodiment of the present invention.

Command FIFO 406 is illustrated in FIG. 5 and includes a number of locations 506-0, 506-1, 506-2, 506-3, . . . (individually or collectively 506) for storing command units received from bus 102.

Figure 6:
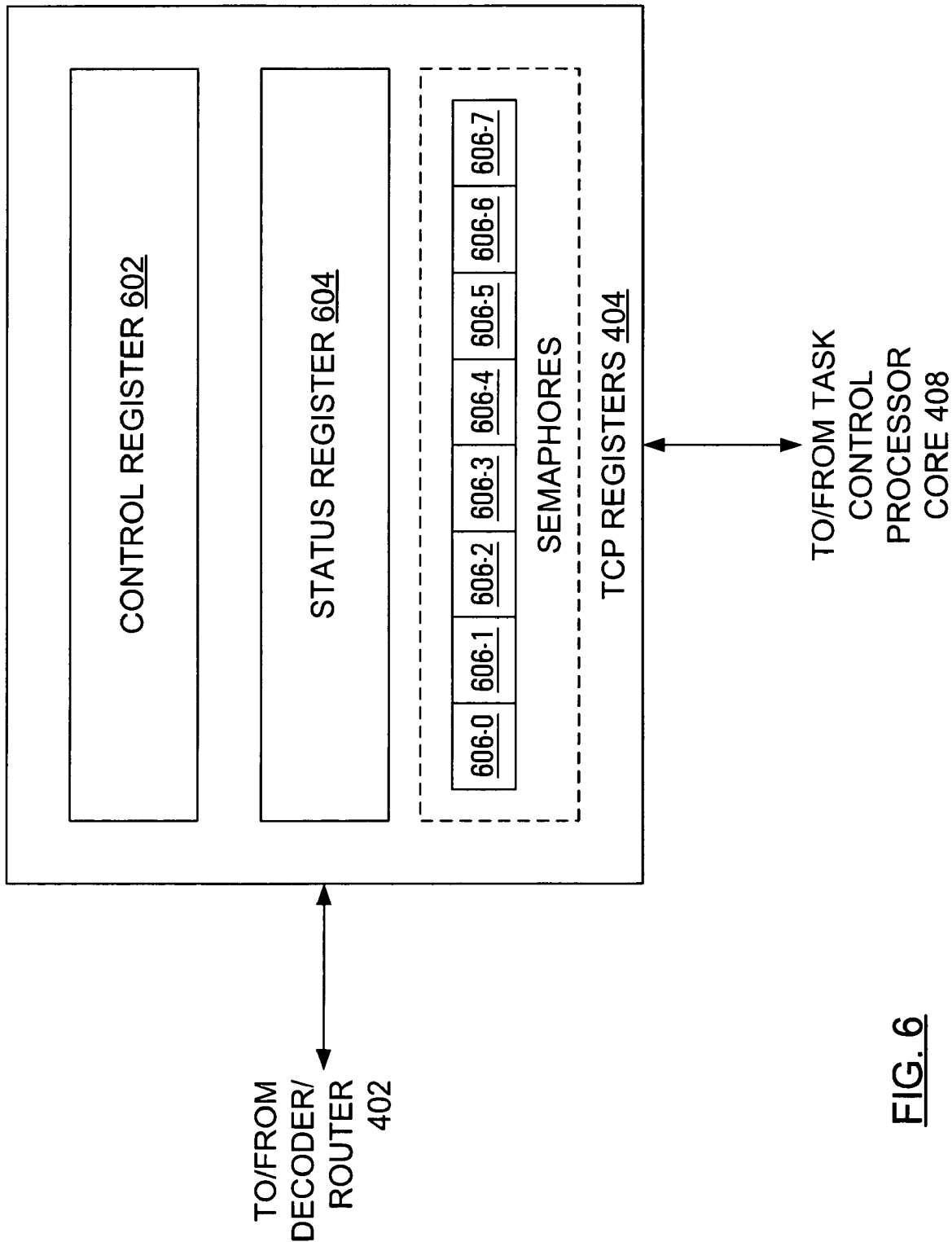
FIG. 6 illustrates an exemplary set of registers for the exemplary task control processor of FIG. 4, according to an embodiment of the present invention.

In an exemplary implementation illustrated in FIG. 6, the collection of TCP registers 404 includes a 32-bit control register 602, a 32-bit status register 604 and eight single-bit semaphores 606-0, 606-1, 606-2, 606-3, 606-4, 606-5, 606-6, 606-7 (individually or collectively 606).

In particular, control register 602 of TCP registers 404 may include four eight-bit fields, one field each for: indicating the depth of the queue in the command FIFO 406; indicating the maximum depth of the queue in the command FIFO 406; indicating the location 506 in the queue in the command FIFO 406 from which the next command unit should be read; and indicating the location 506 in the queue in the command FIFO 406 to which the next command unit should be written.

Further, status register 604 may include multiple fields including fields for: indicating the number of currently available (empty) elements in the queue in command FIFO 406; indicating the number of currently occupied (full) elements in the queue in the command FIFO 406; stalling the task control processor core 408; indicating that the task control processor core 408 should abort a read-until command; indicating whether the "Current Command Register" of the task control processor core 408 contains a read-until command; invalidating the command FIFO 406; indicating that a write to the command FIFO 406 has been attempted while the command FIFO 406 is full; indicating that an illegal command has been encountered by the task control processor core 408; indicating that an error has occurred on a read from the system bus 102 by the task control processor core 408; indicating that an error has occurred on a write to the system bus 102 by the task control processor core 408; indicating that an error has occurred on a read of the system bus 102 by the task control processor core 408; indicating that an error has occurred on a read from an associated execution processor 118 by the task control processor core 408; indicating that an error has occurred on a write to an associated execution processor 118 by the task control processor core 408; and instructing the task control processor core 408 to stall if error bits are set.

Notably, central processor 216 may cause task control processor core 408 to pause the execution of its current command by writing to a specific bit in status register 604. Responsive to such a write, task control processor core 408 will stop doing any read/write transactions to system bus 102, to internal TCP registers 404, or to an associated execution processor. If the task control processor core 408 is not currently executing a command, such a write will cause task control processor core 408 to not fetch the next command unit from the Command FIFO 406 until a subsequent write to the specific bit in the status register 604.

Although the concept of semaphore is typically a software-based mechanism allowing for synchronization between threads or processes on a single processor, the semaphores 606 are hardware implementations (i.e., single-bit state registers) allowing for synchronization between tasks running on separate execution processors 118 (FIG. 2). That is, flow-control instructions executed at a first task control processor may cause the first task control processor to send a command unit to a second task control processor carrying a command to set a semaphore at the second task control processor to indicate completion of a task at an execution processor associated with the first task control processor. The second task control processor may, acting on flow-control commands, delay initiation of a particular task at an execution processor associated with the second task control processor until the semaphore at the second task control processor is determined to have been set.

Figure 7:
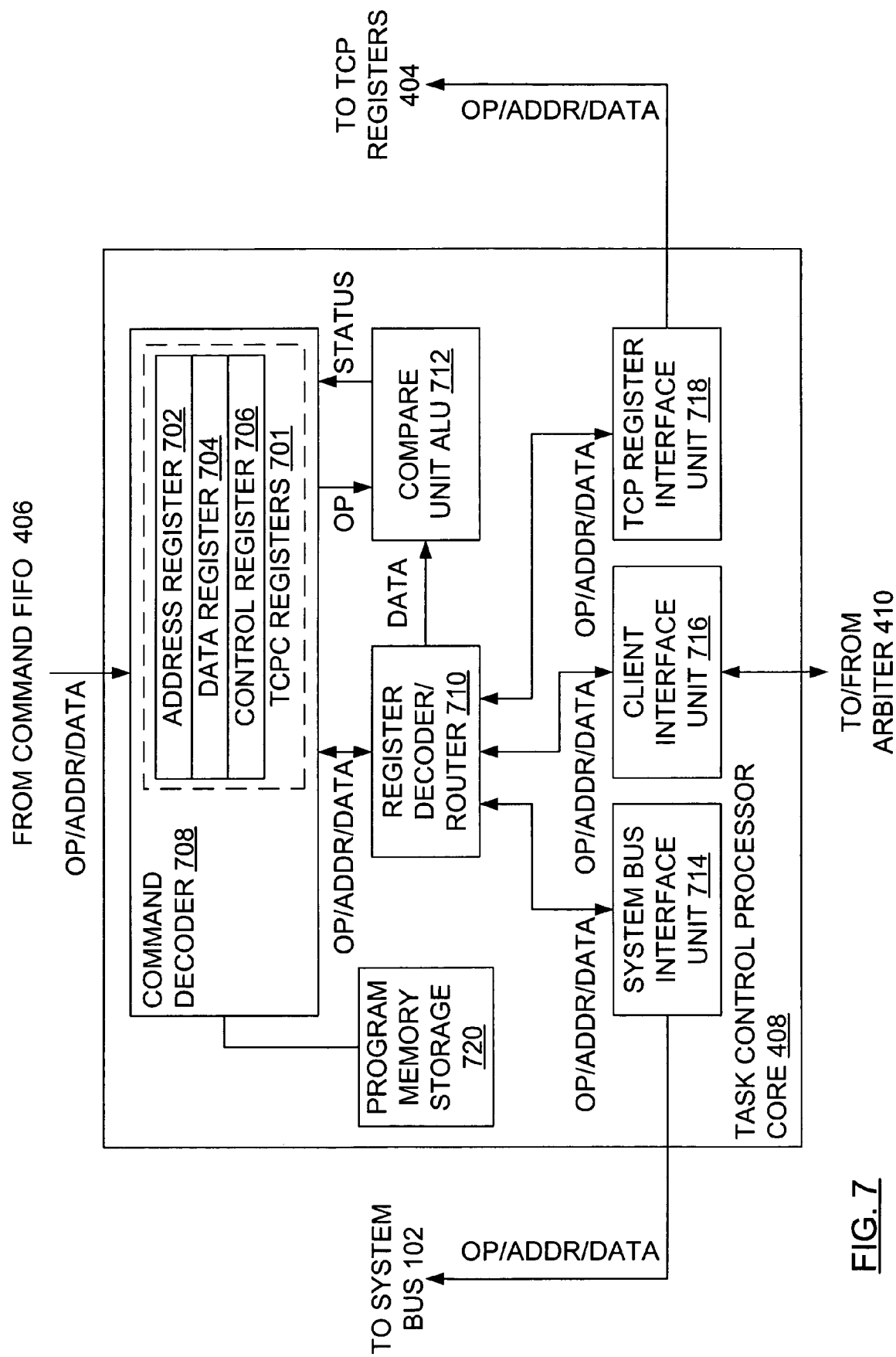
FIG. 7 illustrates an exemplary task control processor core for the exemplary task control processor of FIG. 4, according to an embodiment of the present invention.

An exemplary structure for the task control processor core 408 is illustrated in FIG. 7 to include multiple task control processor core registers 701 including, for instance, an address register 702 (AR), a data register 704 (DR) and a control register 706 (CR). Command units that carry a write command directed to one of these registers may be queued in the command FIFO 406. As illustrated in FIG. 7, the address register 702, the data register 704 and the task control processor core control register 706 are included within a command decoder 708 that is adapted to read command units from the command FIFO 406.

As will be clear to a person skilled in the art, the list of registers presented above as part of the task control processor core registers 701 is not exhaustive. Many other registers may potentially be present, including, for instance, a current command register (not shown).

Command decoder 708 may pass flow-control commands to a register decoder/router 710 or to a compare unit arithmetic logic unit (ALU) 712. According to received flow-control commands, the register decoder/router 710 may communicate with the compare unit ALU 712, with a system bus interface unit 714, with a client interface unit 716 or with a TCP register interface unit 718. The system bus interface unit 714 allows for communication with the system bus 102. The client interface unit 716 allows for communication with the arbiter 410. The TCP register interface unit 718 allows for communication with the TCP registers 404.

Command decoder 708 may be communicatively connected to a program memory storage unit 720, which may be used to store a sequence of commands that are instructions for autonomous execution by the command decoder 708 to configure and control initiation of tasks for an associated execution processor 118.

In one implementation, a single random access memory (RAM) may be logically partitioned (via programming of a configuration register) such that the single RAM has one partition for use as the command FIFO 406 and another partition for use as the program memory storage unit 720. Then, the sequence of commands may be loaded into the program memory storage unit 720 in much the same way that command units are loaded into the command FIFO 406, namely, the central processor 216 may place the TCP 220 into "recording" mode and provide an address in the RAM at which storage of the sequence of commands is to originate. Subsequently, the central processor 216 may feed the sequence of commands to the TCP 220 by doing writes to a TCPC command port (discussed below) and/or to registers at an associated execution processor 118.

This sequence of commands essentially becomes a task that has been loaded into the program memory storage unit 720; i.e., a task for execution by the task control processor core 408, or a "TCPC task". Such a TCPC task may be initiated by a write to a "Trigger Port" of the TCP 220. The TCP Trigger Port may be considered similar to the TCPC command port (discussed below), in the sense that writes to the TCP Trigger Port are placed in the command FIFO 406. The value that the central processor 216 writes to the TCP Trigger Port may, for instance, contain a RAM address of the first command to start executing. Consequently, when the task control processor core 408 reads, from the command FIFO 406, a command unit including a write command to the TCP Trigger Port, the task control processor core 408 may jump to the beginning of the sequence of commands and start executing from there.

Alternatively, the program memory storage unit 720 may be implemented in memory separate from the memory in which the command FIFO is implemented. The sequence of commands may be loaded into the program memory storage unit 720 as described above, namely, the central processor 216 may place the TCP 220 into "recording" mode and provide an address in the program memory storage unit 720 at which storage of the sequence of commands is to originate. Subsequently, the central processor 216 may feed the sequence of commands to the TCP 220 by doing writes to a TCPC command port (discussed below) and/or to registers at an associated execution processor 118.

As alluded to above, a number of ports may be defined to facilitate operation of the task control processors 220. Such ports are logical devices which allow for many side effects. For example, a command unit may carry a flow-control command in data field 304 that calls for a write of data to a port defined for a particular device. The write instruction may cause the particular device to write the data to a memory location specified by a count in a register external to the particular device and, at the completion of the write operation, increment the count.

A port may be addressed in the same way that any other register is addressed. It may be considered that the ADDR field of a given flow-control command (FIG. 8) may be used by the task control processor core 408 to build a command unit with a format as illustrated in FIG. 3. Then, the address field 306 of the command unit 300, is used to indicate that the command unit 300 is destined for a particular port.

The eight single-bit semaphores 606 may be set selectively through the use of an eight-bit (one bit for each semaphore 606) semaphore set port, transmission of a command unit containing a write command to which allows the decoder/router 402 (or the task control processor core 408) to SET one or more semaphores without affecting the other semaphores. Similarly, the semaphores 606 may be cleared selectively through transmission of a command unit containing a write command to an eight-bit semaphore clear port, which allows a programmer to CLEAR one or more semaphores without affecting the other semaphores.

An eight-bit test&set port may be defined for each semaphore 606 along with an eight-bit test&clear port. A test&set flow-control command on a given semaphore 606 may be carried out by transmission of a command unit containing a read command specifying the test&set port of the given semaphore 606. Similarly, a test&clear flow-control command on a given semaphore 606 may be carried out by transmission of a command unit containing a read command specifying the test&clear port of the given semaphore 606.

Since such ports include a field for indicating the number of currently available (empty) elements in the queue in the command FIFO 406 and a field for indicating whether the flow-control command (test&set or test&clear) was successful, a read by the task control processor core 408 from a given port of the ports of this type may be used to determine whether the flow-control command carried out by a read from the given port was successful as well as allowing the determination of the number of currently available locations 506 in the queue in the command FIFO 406.

Associated with the task control processor core (TCPC) 408 may be a TCPC command port, which may be used by elements outside the task control processor 220 (e.g., the central processor 216) to send flow-control commands specifically to the task control processor core 408. Command units that carry a flow-control write command addressing the TCPC command port may be queued in the command FIFO 406 just as other command units are so queued. As such, although an operational mode of the task control processors 220 is available making the task control processors 220 transparent to external elements, such as the central processor 216; to take full advantage of the task control processors 220, the central processor 216 should be aware of the existence of the task control processors 220. Given such an awareness, the central processor 216 may be relieved of the processing associated with typical task flow-control responsibilities. However, the central processor 216 does take on an additional responsibility for generating instructions to program the task flow-control to be implemented by the task control processors 220.

Conveniently, TCPs 220 (FIG. 2) allow a decoupling of the normally closely coupled relationship between a program executed at the central processor 216 and the tasks that are executed on the specialized execution processors 118. The central processor 216 may, for instance, place a stream of command units that mix command units that carry task-related commands (including register write commands for the execution processors 118) with command units that carry flow-control commands (for the task control processors 220) on the system bus 102. Additionally, a given task control processor 220 may execute, according to specific instructions received in a command unit carrying a flow-control command received from the central processor 216, a locally stored program to configure and control the initiation of the execution of tasks for an associated execution processor 118. Advantageously, the task control processors 220 allow for some simple control operations to be executed autonomously from the central processor 216.

Software programs executing on multiprocessor 200 may be written to take advantage of the presence of TCPs 220 and the ability to transfer flow-control portions of the program to TCPs 220, thereby relieving processing required by central processor 216 and traffic on system bus 102.

Advantageously, the use of these task control processors 220 to distribute task management provides the multiprocessor system 200 of FIG. 2 with the flexibility to be programmed to implement any given flow-of-tasks among the execution processors 118.

In operation, command units from the system bus 102 are accepted by the decoder/router 402 (FIG. 4), which categorizes each command unit as carrying a task-related command or a flow-control command. Task-related commands include: task initiation instructions; and task configuration instructions. Flow-control commands include: execution control instructions; TCP register access instructions; and TCPC register access instructions. Received command units carrying task initiation instructions and task configuration instructions are sent, by the accepting TCP 220, to an associated execution processor 118. Received execution control instructions may be used to control the behavior of the accepting task control processor 220. Received TCP register access instructions (which include semaphore manipulation instructions) and TCPC register access instructions may be sent, by the accepting TCP 220, to the appropriate register. Additionally, TCP register access instructions and TCPC register access instructions may be generated (according to execution control instructions) and sent in command units addressed to remote task control processors 220.

Task initiation instructions can include memory mapped register address/data pairs. The task initiation instructions may cause a write of the data in the data field 304 to a register in the execution processor 118, whose address is specified in the address field 306.

Command units may be categorized by the decoder/router 402 as carrying: a write to one of the TCP registers 404; a read from one of the TCP registers 404; a write to one of the TCPC registers 701; a read from one of the TCPC registers 701; a write to the TCPC command port; a read from the TCPC command port; a write to an associated execution processor 118; and a read from an associated execution processor 118.

Those command units categorized by the decoder/router 402 as carrying flow-control commands related to the TCP registers 404 may be directly transmitted to the TCP registers 404 by the decoder/router 402. Command units categorized by the decoder/router 402 as carrying task-related commands related to a write to an associated execution processor 118, along with command units categorized as carrying flow-control commands related to the TCPC registers 701 and the TCPC command port, may be written by the decoder/router 402 to the command FIFO 406. Note that a command unit carrying a task-related command for a read from an associated execution processor 118 bypasses the command FIFO 406. Since the decoder/router 402 is connected to the arbiter 410, the arbiter 410 may be required to select a command unit received from the decoder/router 402 or a command unit received from the task control processor core 408 according to a predetermined selection algorithm, like the alternating selection algorithm mentioned earlier. As selected by the arbiter 410, the received command unit may then be transmitted to the associated execution processor 118.

Dependent on the nature of the task-related command carried by the command unit transmitted, the associated execution processor 118 may generate a response. Such a response, when received by the arbiter 410, is forwarded by the arbiter 410 to the task control processor core 408, which receives the response as an acknowledgement of the completion of the task-related command carried by the received command unit. However, it should be noted that the completion of a given task-related command does not necessarily mean the completion of a task initiated by the given task-related command. As will be discussed, an exemplary manner in which the completion of a task initiated by a task-related command may be detected by the task control processor core 408 requires repeatedly transmitting a read command, specifying a predetermined status register, to an execution processor 118 until the data read from the execution processor 118 indicates that the predetermined status register is set.

Operation of the command decoder 708 of the task control processor core 408 (FIG. 7) may start with a read from the command FIFO 406 by which the command decoder 708 may determine the value in the data field 304, the byte enable field 308 and the address field 306 of a given command unit. If the address in the address field 306 of the given command unit is the address of the TCP 220, then the data field 304 of the given command unit is considered to carry a flow-control command for the task control processor core 408. If the address in the address field 306 of the given command unit references the associated execution processor 118, then the data field 304 of the given command unit is considered to carry a task-related command for forwarding to the associated execution processor 118.

By way of example, consider the arrival, at the command decoder 708, of a command unit carrying a flow-control read command from the command FIFO 406. The read command is transmitted by the command decoder 708 to the register decoder/router 710. The register decoder/router 710 determines, from the address (ADDR) of the flow-control read command, the destination of the read command, which may be the system bus 102, the execution processor 118 (via the arbiter 410) or the TCP registers 404. The register decoder/router 710 then transmits a command unit incorporating the read command to the determined destination via the respective interface 714, 716, 718.

The result of a read command, which may be called "read data", is subsequently returned to the register decoder/router 710 via the respective interface 714, 716, 718. For the read commands that do not specify a destination for the read data, the read data may be passed by the register decoder/router 710 to the compare unit ALU 712. The compare ALU 712 performs the required testing operation to determine whether the condition specified in the read command has been met and returns a result of the testing operation to the command decoder 708. The command decoder 708, upon receipt of the result, determines whether the read command is to be performed again. If it is determined, by the command decoder 708, that the condition has not been met, the read command is again sent to the register decoder/router 710.

For the read commands that specify a destination for the read data, at least for the exemplary read commands presented above, the read data may be passed, by the register decoder/router 710, to the command decoder 708 for writing to the data register 704.

Advantageously, the multiprocessor system 200 of FIG. 2 may be adapted to perform high-speed synchronization between the execution processors 118.

Such high-speed synchronization may be accomplished using a combination of the read-until commands and the ability of a given task control processor 220 to perform test&set and test&clear operations on semaphores 606 that are both local to the given task control processor 220 and remote from the given task control processor 220, across the system bus 102, in another task control processor 220.

For example, the first task control processor 220A may wait for the first execution processor 118A to become idle before issuing a semaphore manipulation instruction across the system bus 102 to set a particular semaphore 606-2 in the second task control processor 220B. Meanwhile, the second task control processor 220B may be waiting for the given semaphore to be set. Once the second task control processor 220B detects the semaphore being set, the second task control processor 220B can control the delivery of a task initiation instruction to the second execution processor 118B.

In particular, to start the example, task control processor core 408 of the first task control processor 220A determines that the first execution processor 118A has become idle. Where the first execution processor 118A is arranged to set a predetermined internal status register when idle, such a determination may be accomplished, for instance, by arranging the command decoder 708 to repeatedly transmit a read command, specifying the predetermined status register, to the first execution processor 118A until the data read from the first execution processor 118A indicates that the predetermined status register is set. A read-until command, as described, may be suitable for such a determination.

Meanwhile, command decoder 708 of the second task control processor 220B may repeatedly read from the test&clear port associated with a particular semaphore 606-2 of the second task control processor 220B and determine that the particular semaphore 606-2 has not been set.

The register decoder/router 710 of the first task control processor 220A may, upon determining that the first execution processor 118A has become idle, transmit a command unit carrying a semaphore manipulation instruction to the system bus interface 714, where the semaphore manipulation instruction specifies the address of a semaphore set port and the command unit specifies the address of the second task control processor 220B.

The system bus interface 714 may, in response, place the command unit carrying the semaphore manipulation instruction on the system bus 102 such that the command decoder/router 402 at the second task control processor 220B accepts the command unit carrying the semaphore manipulation instruction.

The command decoder/router 402 of the second task control processor 220B may then write the data of the semaphore manipulation instruction to the semaphore set port of the second task control processor 220B, thereby setting the particular semaphore 606-2.

The command decoder 708 of the second task control processor 220B may then read from the test&clear port associated with the particular semaphore 606-2 of the second task control processor 220B and detect that the particular semaphore 606-2 has been set. In which case, the command decoder 708 of the second task control processor 220B may control the initiation of a task on the second execution processor 118B. Such control of task initiation may be accomplished by controlling the delivery of a task initiation instruction specifying a particular register in the second execution processor 118B that has been pre-arranged to initiate the task.

As will be clear to a person skilled in the art, the system bus 102 may be local to a single chip, may be local to a card on which the execution processors 118 are installed and may range in size to that of a world wide data network such as the present-day Internet and successors, thereby allowing wide distribution of the execution processors 118.

Advantageously, aspects of the present invention allow for a group of the programmable task control processors 220 to be connected together in a network, so that the network can be programmed to implement any given flow-of-tasks among execution processors 118 in the multiprocessor system 200.

It is contemplated that the command units carrying flow-control commands sent by the central processor 216 to the task control processor core 408 may form a relatively small set. As such, the task control processor core 408 may be preprogrammed with oft-used sequences of flow-control commands. With such a preprogrammed task control processor core 408, the central processor 216 may only need to transmit a reference to a particular sequence of flow-control commands, rather than the entire sequence of flow-control commands, thereby reducing command overhead.

As will be readily appreciated by a person of ordinary skill in the art, elements that the multiprocessor system 200 of FIG. 2 has in common with the typical multiprocessor system 100 of FIG. 1, such as the execution processors 118 and the system bus 102, may be modified for improved or altered interaction with the task control processors 220.

Other modifications will be apparent to those skilled in the art and, therefore, the invention is defined in the claims.

We claim:

1. A multiprocessor system comprising:
a plurality of execution processors, each of said execution processors for executing tasks;
a plurality of task control processors,
each task control processor of said plurality of task control processors being in communication with at least one of said plurality of execution processors for controlling initiation of execution of one of said tasks on said at least one of said plurality of execution processors;
said each task control processor including memory for storing execution control instructions and task initiation instructions, said execution control instructions to be executed by said each task control processor to control delivery of said task initiation instructions to said at least one of said plurality of execution processors; and a central processor in communication with said task control processors for providing said execution control instructions to said task control processors, wherein said execution control instructions, when executed by a first task control processor among said plurality of task control processors, allow said first task control processor to:
   detect completion of a given task on a specific one of said at least one of said plurality of execution processors, and
   control delivery of state register manipulation commands from said first task control processor to a second task control processor.

2. The multiprocessor system of claim 1 wherein said execution control instructions are further to be executed by said each task control processor to control delivery of instructions for configuring a task, to said at least one of said plurality of execution processors.

3. The multiprocessor system of claim 1 wherein, in operation, said memory stores said execution control instructions and said task initiation instructions such that an order of receipt of said execution control instructions and said task initiation instructions is preserved.

4. The multiprocessor system of claim 1 wherein a given one of said task initiation instructions defines a write command to one of said at least one of said plurality of execution processors.

5. The multiprocessor system of claim 1 wherein said plurality of execution processors includes a programmable processor in communication with computer readable memory storing program instructions defining tasks to be executed by said programmable processor.

6. The multiprocessor system of claim 5 wherein said programmable processor is a Digital Signal Processor.

7. The multiprocessor system of claim 5 wherein said programmable processor is a Reduced Instruction Set Computer processor.

8. The multiprocessor system of claim 1 wherein said plurality of execution processors includes a fixed-function processor.

9. The multiprocessor system of claim 8 wherein said fixed-function processor is a motion estimation unit.

10. The multiprocessor system of claim 8 wherein said fixed-function processor is a discrete-cosine transform unit.

11. The multiprocessor system of claim 8 wherein said fixed-function processor is a direct memory access unit.

12. At a first task control processor, a method of managing tasks in a multiprocessor system comprising:
   receiving execution control instructions;
   receiving a task initiation instruction;
   according to said execution control instructions:
      transmitting said task initiation instruction to an associated execution processor to initiate execution of a first task;
      detecting completion of said first task on said associated execution processor; and
      responsive to said detecting said completion, controlling delivery of a state register manipulation command from said first task control processor to a second task control processor, said each of said first and said second task control processors including memory for storing said execution control instructions and said task initiation instruction; and
   a central processor communicatively coupled to each of said first and said second task control processors for providing said execution control instructions and said task initiation instruction.

13. A method of managing tasks in a multiprocessor system comprising:
   receiving execution control instructions by a task control processor of said multiprocessor system;
   receiving a task initiation instruction by said task control processor;
   receiving a state register manipulation command by said task control processor, said state register manipulation command setting a state of a state register;
   according to said execution control instructions:
      determining said state of said state register; and
      responsive to said determining said state of said state register, controlling delivery of said task initiation instruction to an associated execution processor of said task control processor to initiate execution of a task.

14. A task control processor in communication with an execution processor, said task control processor comprising:
   a memory for storing execution control instructions and task initiation instructions; and
   a task control processor core for:
      receiving said execution control instructions and said task initiation instructions from said memory, said task initiation instructions comprising write commands to said execution processor; and
      executing said execution control instructions to control delivery of said task initiation instructions to said execution processor, wherein said memory is a first-in-first-out queue adapted to maintain said execution control instructions in an order relative to other execution control instructions in said queue.

15. The method of claim 13 wherein said state register comprises a semaphore.

16. The method of claim 13 wherein said task initiation instruction is delivered to said associated execution processor if said semaphore is determined to have been set.

17. The task control processor of claim 14 wherein said task control processor core comprises:
   a program memory storage, wherein a single random access memory may be logically partitioned by way of programming of a configuration register such that said single random access memory comprises one partition for use as said first-in-first-out queue and a second partition for use as said program memory storage.

18. The task control processor of claim 14 further comprising a plurality of registers, said plurality of registers comprising:
   a register for:
      indicating a depth of said first-in-first-out queue;
      indicating a maximum depth of first-in-first-out queue;
      indicating a location in said first-in-first-out queue from which a first next command should be read from; and
      indicating a location in said first-in-first-out queue to which a second next command should be written into.

* * * * *